United States Patent [19]

Fung

[11] Patent Number: 4,535,420
[45] Date of Patent: Aug. 13, 1985

[54] CIRCULAR-QUEUE STRUCTURE

[75] Inventor: Anthony K. Fung, Fountain Valley, Calif.

[73] Assignee: Sperry Corporation, New York, N.Y.

[21] Appl. No.: 389,823

[22] Filed: Jun. 18, 1982

Related U.S. Application Data

[63] Continuation of Ser. No. 79,208, Sep. 26, 1979, abandoned.

[51] Int. Cl.³ .............................................. G06F 11/00
[52] U.S. Cl. ...................................... 364/900; 371/67
[58] Field of Search ... 364/200 MS File, 900 MS File; 371/67

[56] References Cited

U.S. PATENT DOCUMENTS

| 4,004,281 | 1/1977 | Bennett | 364/200 |
|---|---|---|---|
| 4,032,899 | 6/1977 | Jenny | 364/200 |
| 4,032,900 | 6/1977 | Kashio | 364/200 |
| 4,115,868 | 9/1978 | Suzuki | 364/200 |
| 4,125,870 | 11/1978 | Suzuzi | 364/900 |
| 4,127,896 | 11/1978 | Raslavsky | 364/200 |
| 4,149,242 | 4/1979 | Pirz | 364/200 |
| 4,152,761 | 5/1979 | Louie | 364/200 |
| 4,163,280 | 7/1979 | Mori | 364/200 |
| 4,164,787 | 8/1979 | Aranguren | 364/200 |

Primary Examiner—James D. Thomas
Assistant Examiner—David Y. Eng
Attorney, Agent, or Firm—John B. Sowell; Thomas J. Scott; Marshall M. Truex

[57] ABSTRACT

Apparatus for producing a circular-queue structure which permits interfacing between a high speed minicomputer and a relatively slow speed microprocessor via a common memory and with multi-device, asynchronous handling capability. The structure also permits commands and data to be chained in the same queue. The apparatus permits multiple devices to be handled simultaneously. By monitoring the memory address which is being accessed by the minicomputer, the information retrieved from the memory by the microprocessor is selectively validated or invalidated.

18 Claims, 5 Drawing Figures

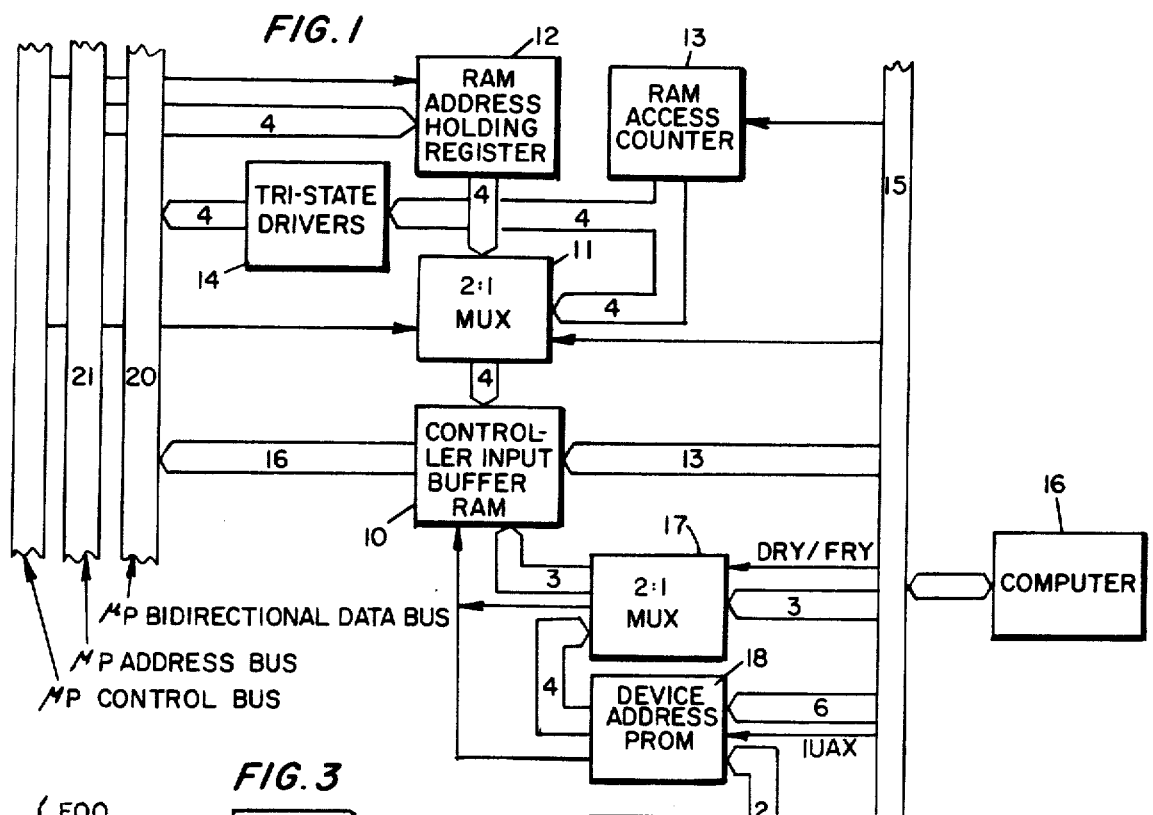
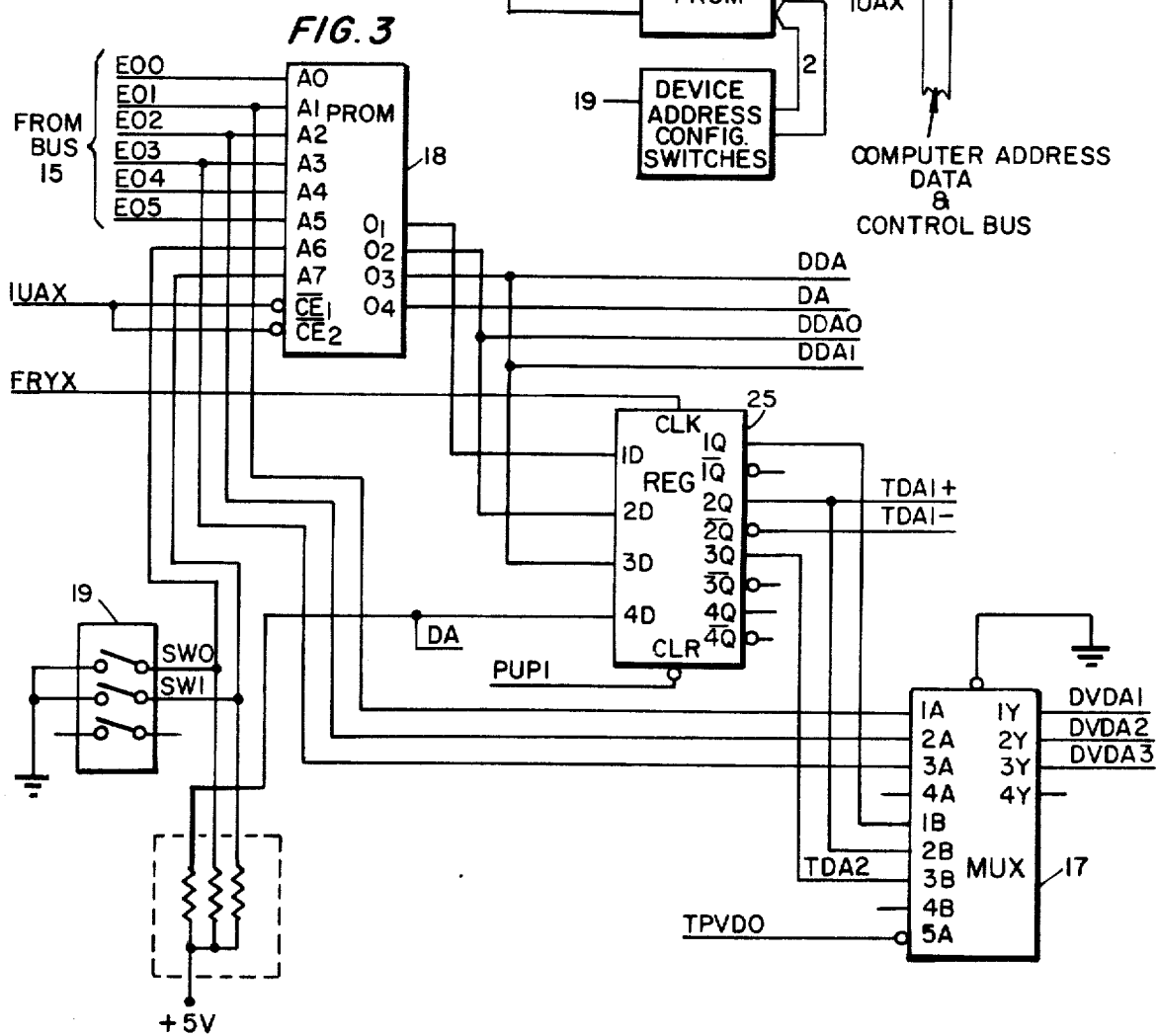

CIRCULAR-QUEUE STRUCTURE

This is a continuation of application Ser. No. 06/079,208 filed 9-26-79, now abandoned.

BACKGROUND

1. Field of the Invention

This invention is directed to an interfacing circuitry arrangement, in general, and to an interfacing circuit which permits the handling of multiple devices in a circular-queue arrangement, in particular.

2. Prior Art

In the past, in order to permit a mini-computer to operate on one or more devices in the same controller, an extensive hardware and software configuration was required. In particular, it was generally required to have one complete set of interfacing hardware for each device within the same controller. This interfacing hardware included such materials or functions as a command register, data register, a direct memory access (DMA) data register, or first-in, first-out (FIFO) device along with appropriate command decode circuitry and the like. This apparatus, in addition to being quite costly, was not very flexible in utilization and, as noted, required a set of hardware for each device. In addition, it was not possible to "chain" any commands in the circuit operation.

In other configurations, the data/DMA FIFO, as controlled by a minicomputer bus, was directed to the first device of the controller. The information from the first device was processed by the controller. At the end of the operation, the FIFO resources were reassigned to the second device of the controller. This sequence continued until all the operations on different devices were satisfied. This approach was slow and not very flexible as well as having little or no advantageous operation.

In another approach, a dual port memory was utilized between the minicomputer bus and the controller wherein information was entered by the minicomputer on one port of the memory and information was taken out on the other port by the controller device. However, a device of this nature did not allow commands and DMA data chaining. In addition, it was expensive to implement and extensive memory size was usually required. Therefore, this approach was undesirable also.

In another approach, a first-in, first-out (FIFO) device was developed. In this type of device, various kinds of data were stored in the memory, in sequence. As a consequence, in order to remove or retrieve any data from this memory, it was essential and necessary to fetch all the commands and data that had been entered in the FIFO in order to obtain the appropriate data therefrom. Clearly, this operation is time-consuming and requires extensive amounts of hardware and software.

SUMMARY OF INSTANT INVENTION

This invention is directed to a unique arrangement wherein both a minicomputer and microprocessor supply control signals to a RAM which controls the passing of commands and data from the minicomputer to the microprocessor. The minicomputer operation is arranged to take precedence over the microprocessor operation. By appropriate testing or sampling of the minicomputer access pointer, the integrity of the information retrieved from the RAM by means of the microprocessor operation is preserved.

BRIEF DESCRIPTION OF THE DRAWINGS

FIG. 1 is a block diagram of the instant invention.

FIG. 3 is a detailed block diagram of the minicomputer device address proms and interface portion of the instant invention.

DESCRIPTION OF A PREFERRED EMBODIMENT

Figure 2:
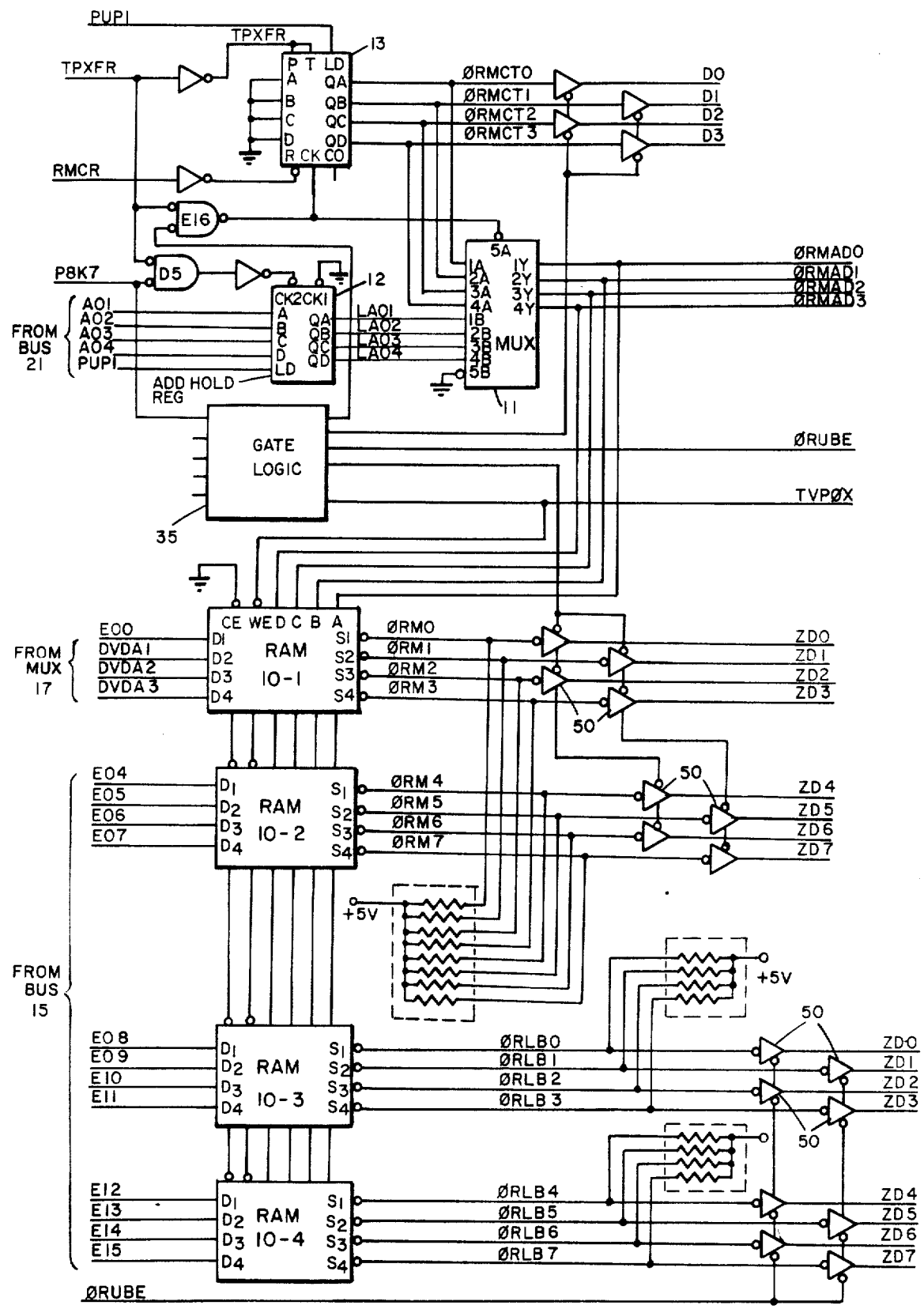
FIG. 2 is a detailed circuit diagram of the minicomputer output buffer interface portion of the instant invention.

Referring now to FIG. 1, there is shown a block diagram of the system of the instant invention. A memory unit 10, such as a random access memory (RAM), is provided. The size or content capability of the RAM is dependent upon the utilization made thereof. In the instant application, the RAM has a $16 \times 16$ bit configuration.

A multiplexer (MUX) 11 is arranged to provide address signals to RAM 10. One of the sets of input signals supplied to multiplexer 11 is provided by address holding register 12 associated with the microprocessor. The other group of input signals is supplied to MUX 11 by access counter 13 which is associated with the minicomputer. These same signals are also supplied to tri-state drivers 14. The output terminals of MUX 11 are connected to the address terminals of RAM 10. The output terminals of RAM 10 are connected to microprocessor data bus 20 as are the output terminals of tri-state drivers 14.

The microprocessor address bus 21 is connected to supply signals to address holding register 12. Similarly, the minicomputer bus 15 is connected to supply control signals to access counter 13. While not so limited, it is suggested for purposes of explanation, that the microprocessor circuit involved herein is a Z80 microprocessor. Clearly, other microprocessors can be utilized. Likewise, it is suggested that the Sperry Univac V70 minicomputer series is used with the system which is under discussion.

Referring still to FIG. 1, it is seen that the data and control bus 15 supplies input signals to input terminals of RAM 10. In addition, bus 15 supplies signals to device address prom 18 and to MUX 17. The signals supplied to prom 18 are the control signal IUAX and the device address bits from the E-bus. The IUAX signal is used to identify the data on the V70 bus as device address data and not direct memory access data. The prom 18 operates upon the signals, as appropriate, and supplies a set of translated device address signals to one set of input terminals of MUX 17 which is a 2:1 multiplexer. The other set of input terminals of the multiplexer 17 accepts nontranslated commands whereby MUX 17 data and produces data signals as outputs which are supplied to the input terminals of RAM 10. Depending upon the status of control signal DRY/-FRY, MUX 17 may provide data signals directly to RAM 10 from bus 15.

In one embodiment of the invention, device address configuration switches 19 are connected to device address prom 18. By changing the switch settings, the device address translation operation of prom 18 can be altered thereby extending the capability of the circuit of the instant invention.

In a brief overview of the operation of the system shown in FIG. 1, it is assumed that the minicomputer 16 provides data information to RAM 10 via minicomputer bus 15. Likewise, microprocessor bus 20 retrieves data from RAM 10 in accordance with the address provided by the microprocessor along address bus 21.

In a typical operation, the address information on bus 21 is supplied to register 12 where it is effectively stored and supplied to MUX 11. MUX 11 is connected to supply the signals therefrom to the address terminals of RAM 10. In the current embodiment, the address signals from bus 21 pass substantially directly through register 12 and MUX 11 to the address input terminals of RAM 10. These address signals select the portion or cell of RAM 10, the contents of which is to be outputted to bus 20. Likewise, the minicomputer information on bus 15 is supplied to access counter 13 which is also connected to MUX 11. Inasmuch as MUX 11 can only transmit information from either counter 13 or register 12, on a mutually exclusive basis, the operation of MUX 11 will control the addressing of RAM 10. Thus, MUX 11 will supply address signals to RAM 10 from register 12 except when signals are presented by counter 13.

That is, inasmuch as minicomputer operation (as signified by activity on bus 15) is given higher priority in the system operation, the minicomputer bus 15 also supplies a control signal PGMIO to MUX 11 which will automatically cause MUX 11 to transfer therethrough any information which is provided by counter 13. Thus, when MUX 11 is activated by counter information on bus 15, register 12 will be overridden and counter 13 will provide address information to RAM 10.

Therefore, it is possible that during the retrieval of information from RAM 10 to bus 20, the minicomputer 16 may address RAM 10 and insert information therein. In this situation RAM 10 becomes, essentially transparent and information is transferred therethrough to the microprocessor bus 20. To prevent this inaccurate data situation, the minicomputer access address in counter 13 is stored in a temporary store (see memory 404 in FIG. 4) via bus 20 and tri-state drive circuits 14 at the time the microprocessor begins an operation. When the data has been read on bus 20, the minicomputer address at counter 13 is compared with the original minicomputer address previously stored. The original address (referred to as the "image") will be the same if the minicomputer has not performed an operation in the interim. If the image and the current minicomputer address are identical, the information previously fetched from RAM 10 by the microprocessor will be considered as valid information. if, conversely, the image and the current address of the minicomputer are not identical (i.e., minicomputer 16 has performed an operation) the data previously fetched from the RAM 10 will be considered invalid and the RAM data retrieval operation relative to bus 20 is repeated. The image and current address are again stored and compared. This operation continues until the comparison indicates that the minicomputer address is identical with the image, at which time the data is transferred from RAM 10 to bus 20 and, thence, to the ultimate utilization device. Therefore, in the manner described above, an equivalent operation of a dual port memory has been implemented.

Thus, there has been described the method of controlling the access to the RAM 10, and the method of obtaining output signals therefrom. However, in order to store information in RAM 10, the information is supplied from bus 15 to the data input terminals of the RAM. These input signals are supplied from the V70 bus 15 (address, data and control bus) to RAM 10 in the form of 13 bits of a word. As noted, RAM 10 is a 16-bit memory, and the other 3-bits are supplied thereto from MUX 17. MUX 17 controls the source of the other 3-bits. MUX 17 is controlled by the DRY/FRY control signals as noted above. In particular, the DRY signal indicates a "data ready" status, while the FRY signal indicates a "function ready" status. Thus, depending upon the system status, MUX 17 receives the appropriate control signal and transfers appropriate "data" signals to the other input terminals of RAM 10.

That is, device address prom 18 receives the six bits E00 through E05 (see FIG. 3) which represent the device address bits. These signals, in conjunction with the control signal, produce translated device address output signals as a function of decoding of the prom. These output signals are supplied to MUX 17. As previously noted, MUX 17 also receives the signals E01, 02 and 03 from bus 15. Depending upon the status of the FRY/DRY signals, MUX 17 supplies the signals from the bus 15 or from prom 18 to the other inputs of RAM 10.

As noted, in one embodiment of the invention, configuration switch circuitry 19 supplies additional control signals to prom 18 to alter the storage configuration and, thus, the output signals supplied by prom 18. This circuitry has the advantage of expanding the capability of the system and permits programming different sets of translated device addresses.

Referring now to FIG. 2, there is shown a more detailed block diagram of the circuitry of the instant invention. In the embodiment shown in FIG. 2, RAM 10 is comprised of four memory devices, 10-1, 10-2, 10-3 and 10-4, each of which is a 4×16 RAM memory. This arrangement is utilized in order to make use of existing devices. Other numbers of memories or other memory configurations can be utilized, if so desired.

The address input terminals A, B, C, D or each of the RAM cells are connected to the output terminals 1Y, 2Y, 3Y, 4Y of MUX 11. MUX 11 is a 2:1 type of multiplexer and operates as suggested relative to FIG. 1. The A-input terminals of MUX 11 are connected to counter 13 which is connected to bus 15 through gate logic 35 wherein the computer pointer is derived. Also, the same output terminals of address counter 13 are connected to the tri-state drivers 14 to produce the pointer address which is used in the "image" checking process noted above. The B-input terminals of MUX 11 are connected to register 12 which is connected to the address bus 21 wherein the microprocessor pointer is derived. The control terminal 5A of MUX 11 is connected to receive the control signal PMGIO which reflects the multiplexer operation. That is, signal PMGIO determines when the inputs from register 13 will be transferred through MUX 11. This is a function of the FRY signal (via gate logic 35) and the trap transfer signal TPXFR which indicates a DMA data transfer. The absence of both of these conditions permits MUX 11 to transfer the register 12 signals to RAM 10. Gate logic 35 operates on a plurality of input signals to effectively control MUX 11 and to control the write enable (WE) operation of RAM 10. Likewise the signals ORUBE and ORLBE control the selection of upper and lower bytes of the "words" to be fetched from RAM 10.

The output terminals S1-S4 of each of the RAM devices are connected to the microprocessor bus 20 via appropriate inverter drivers 50 which are desirable in the preferred embodiment but are not absolutely necessary in all applications of the invention. In addition, the input terminals of RAM 10-1 are connected to receive the signals E00 (from bus 15) and DVDA1-DVDA3 from MUX 17 (see FIGS. 1 and 3). Thus, the signal E00 is supplied directly from the bus while the other signals are provided as a function of the operation of MUX 17 and prom 18 as previously described relative to FIG. 1. RAMS 10-2, 10-3 and 10-4, receive the signals E04-E15 directly from bus 15 and operate thereon accordingly. That is, when appropriate, the input signals are written into the RAMs by computer 16. Conversely, in a read mode, the contents of the RAMs are read out as signals ZD0-ZD7 (either upper or lower byte as determined by the ØRUBE or ØRLBE signals.)

Referring now to FIG. 3, register 25 is connected to receive the output signals from prom 18. These signals are supplied to the input terminals of register 25 and comprise four signals. In addition, register 25 receives the FRY signal at the clock terminal thereof which, effectively, causes register 25 to receive and latch the signals supplied to the input terminals thereof and, as well, to selectively transfer the signals to the output terminals. It is noted that only three output terminals or register 25 are connected to MUX 17. Thus, these connections provide the three input signals to input terminals of MUX 17, and, thus, to RAM 10, when the system is in the function ready status. That is, the function ready (FRY) signal supplied to register 25 permits appropriate signals to be transferred to MUX 17 as a function of the prom 18 output. MUX 17 is selectively controlled by appropriate input signals at terminal 5A which specifies the system operation. Thus, the input information or word on the V70 bus 15 is translated in terms of the contents of prom 18 and the translated signal is supplied to RAM 10. That is, in the absence of the FRY signal (i.e. when the system is in the DRY status), register 25 is not selected and the signals from bus 15 are fed directly to MUX 17 and, therethrough, to RAM 10.

It should be noted that the function ready signal (FRY) permits a function operation to occur. Contrariwise, the DRY signal permits only data to be transferred to the RAM 10. When a function signal or word is transferred to the RAM, the control signals (which are, in essence, signals E6 through E15) cause the machine to produce a function control as well as the transfer of data. The function control together with the device address (which are signals E00 through E05) will, inter alia, determine which peripheral equipment can be operated. The peripheral equipment involved can be a diskette disc drive and a magnetic tape drive or the like. This information is stored in RAM 10 and, subsequently, retrieved by the microprocessor in the fashion described wherein a control function operation occurs.

This operation is, as described supra, controlled by microprocessor 12. The microprocessor supplies control signals to MUX 11 which selects the address in RAM 10 (in the absence of a FRY or DRY signal). With the selection of an address in memory at RAM 10, the RAM contents are supplied to bus 20 and the appropriate operation takes place.

One of the operating modes of the circular queue structure of the instant invention provides significant data compression. That is, while the circular queue structure is receiving command instructions from the V70 computer 16, it is possible for large portions of data stored in the V70 computer's memory to be read or transferred from the computer to the controller memory via RAM 10 under the microprocessor control. That is, the computer 16, by means of a WRITE-TO-DISK command, requests that a block of data be transferred from the memory of the V70 computer to the memory of the controller and then onto the disk (Direct Memory Access Method). The WRITE-TO-DISK command is chained up in the RAM 10. When the Z80 microprocessor finally processes this command, its location will be loaded into the address holding register 12. This fixes one location in the RAM 10 through which the entire block of memory from the V70 will be transferred. No RAM 10 memory location before or after the specific RAM 10 location will be disturbed. Since the specific location in the RAM 10 previously contained the WRITE-TO-DISK command and was processed before the transfer begins the location was essentially reused. In operation, register 12 stores the address of the WRITE-TO-DISK command signal in the RAM and the Z80 continues to access RAM 10 via MUX 11 at that address. As a consequence, the information which is supplied to the selected address by the V70 DMA logic, i.e., the address to which the register 12 points, is read directly from RAM 10 into the controller memory under Z80 control. In this manner, a large portion (e.g., a page of information) can be directly transmitted from the V70 computer to the controller memory without using any extra memory space of the RAM memory 10.

In implementing this operation, it is assumed that a large amount of information in the computer memory is selected for transfer to the controller via the microprocessor. For example, it is assumed that a block of information comprising data words 0 through 1000 are to be transferred from the computer controller to the memory. Rather than transferring each of these words from the computer to the RAM 10 and waiting until the Z80 can access the memory and retrieve the information, the command signal is stored in the next available location in RAM 10. The WRITE-TO-DISK command is then accessed and interpreted by the Z80 microprocessor.

The WRITE-TO-DISK command will, typically, include an instruction to read the words 0 through 1000 (in the example given). Therefore, the memory in the V70 computer is serially accessed by the V70 DMA logic wherein word 0 is fetched from, and stored in, the location of RAM 10 where the WRITE-TO-DISK command was previously located.

This information is then retrieved by the Z80 microprocessor. The word 1 is then transferred to the same location in RAM 10 and retrieved by the Z80 microprocessor. The word 2 is then transferred to the same location in RAM 10 and, thereafter, retrieved by the microprocessor Z80. This procedure continues, in seriatum until all of the words 0 through 1000 are transferred to the same location in RAM 10 and retrieved by microprocessor Z80. When word 1000 is transferred, the subroutine instruction in the Z80 microprocessor detects the situation and terminates this loop.

In the meantime, other command instructions or programmed data can be chained in subsequent locations of RAM 10 for ultimate access and control by the microprocessor Z80. In this manner, only one address in RAM 10 has been utilized to transfer a large block of information. In the example, up to 1000 words were transferred. It is well within the possibility of existing hardware that up to 32K bytes K=1024 of information can be transferred through the RAM as it currently exists. If a two-byte word configuration is utilized, this transfer permits up to 32K 16-bit words to be transferred without problem. The words are transferred in sequence (or consecutive order) from the V70 memory to the controller memory. However, only one address in the RAM 10 has been utilized.

In addition, it must be understood that additional capability can be achieved through the expedient of using a "deeper" RAM. That is, in the example, RAM 10 has a 16-word depth. Thus, up to 15 additional commands can be chained in RAM 10 without causing an overlay on the address in question. If RAM 10 were constructed to be 32 words deep, an additional 31 commands could be chained without causing any overlap or overlay of instructions or commands.

In the embodiment shown and described, it is easily possible to transfer enough information from a computer through the microprocessor controller to a floppy disc controller apparatus to permit several sectors of information to be transferred conveniently and without any information loss.

Figure 4:
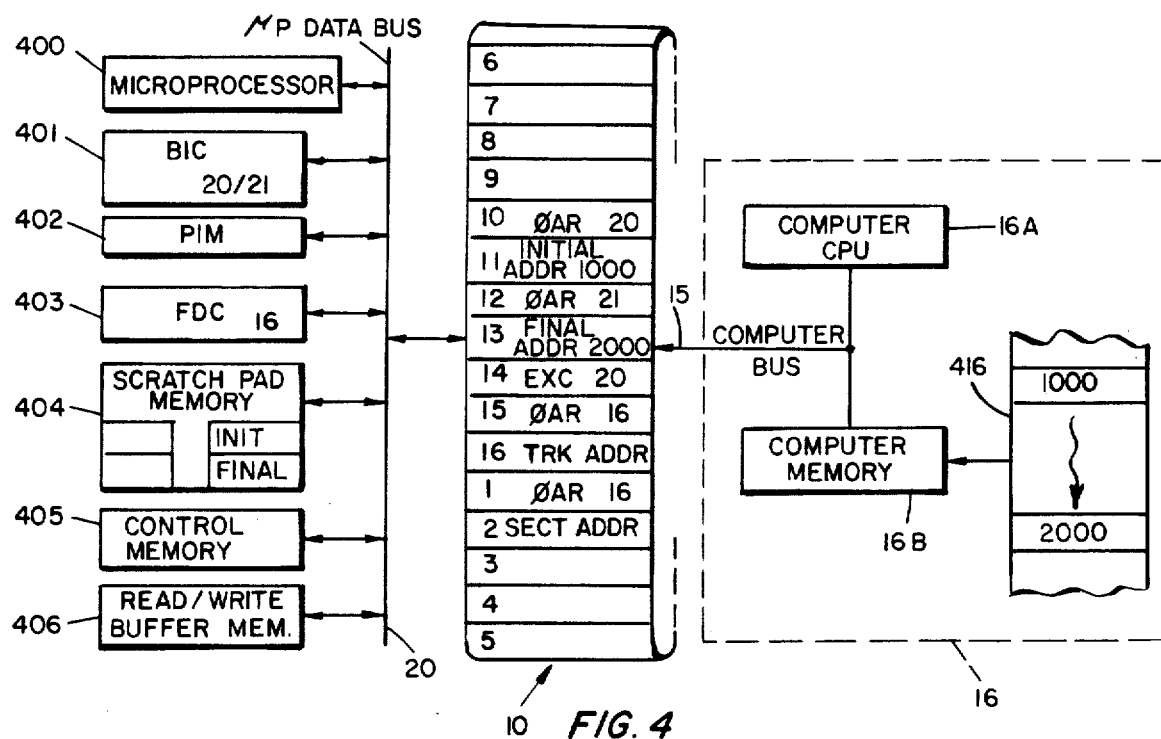
FIG. 4 is memory map diagram of the system operation.

Another distinct advantage of the system architecture as shown and described herein is the ability of the system to "chain" both data and commands in any sequence including interspersed data and commands. Referring to FIG. 4, there is shown a memory map and block diagram representation of the operation. In this representation, computer 16 is shown to include the computer 16 CPU 16A and the computer memory 16B. These portions of computer 16 (enclosed in the dashed outline) are connected to RAM 10 along the data and control bus 15 as shown in FIG. 1. RAM 10, in this embodiment, is illustrated as a continuous or scrolling-type memory, --thus, the concept of a circular queue. Inasmuch as the RAM 10 is previously defined as being 16 words deep, a RAM 10 having 16 memory cells or addresses is depicted. The circular queue effect permits the memory to have information (i.e., data or addresses) placed in the respective memory cells continuously. In point of fact, the operation of computer 16 is such that information is output therefrom, along bus 15, in a substantially continuous fashion. Therefore, the information which is provided to RAM 10 is continuously inserted into the next available RAM cell or address irrespective of the operation of other portions of the circuit.

In addition, RAM 10 is connected to output onto data bus 20, which in this embodiment is a bi-directional data bus. However, this bus will accept information from RAM 10 without regard to whether it is data, address information, a command or the like. The information on bus 20 is applied to microprocessor 400 for operation. In the illustrative example, the information on bus 20 is also supplied to a BIC (Buffer Interface Controller) and to a PIM (Priority Interrupt Module). It must be understood that the BIC and/or PIM components can be separate and distinct circuits of a stand-alone nature. On the other hand, these circuits can be incorporated into the microprocessor chip. In point of fact, the BIC and PIM functions can actually be implemented in terms of firmwear in the microprocessor 400.

The bus 20 also supplies information to floppy disc controller 403 (FDC), to scratch pad memory 404, to control memory 405, and to the Read/Write buffer memory 406. Again, the control, scratch and/or buffer memories can be separate, stand-alone items or can be incorporated into the microprocessor 400. In describing the theory of operation, an example is considered useful. In the example, a page 416 of information is to be transferred from computer memory 16B to Read/Write buffer memory 406. This page of information is defined to begin at address 1000 and terminate at address 2000. Of course, the addresses are illustrative only.

In effecting the transfer, computer 16 provides to bus 15 from CPU 16A, an instruction that causes a command to be fetched from computer memory 16B and supplied to RAM 10 via bus 15. In the illustration, the command ØAR 20 (output from A register) is supplied to and stored in location 10 in RAM 10. This command is appropriate to, essentially, enable BIC 401 to recognize that the device address thereof (i.e., device address 20), has been selected by prom 18 and MUX 17 and that further activity will be forthcoming. Next, computer 16 applies the initial address of memory area 416 to be transferred (i.e., address 1000). This address is stored in location 11 in RAM 10 via computer bus 15. This address information is also supplied along microprocessor bus 20 wherein microprocessor 400 under control of control memory 405 stores the initial address in scratch pad memory 404 in the block identified as INIT. The scratch pad memory 404 begins to "build a task" which will be performed. Next, computer 16 applies the command ØAR 21 which is stored in location 12 in RAM 10. This command is appropriate to, essentially, enable BIC 401 to recognize that the device address thereof has been selected and that the final address information is forthcoming. Computer 16 then supplies the final address of memory area or page 416 which is stored in RAM location 13. Again, the microprocessor has informed BIC 401 that the final address is being presented and the "BIC portion" of scratch pad memory 404 is enabled to receive the final address information. Thus, the BIC task has now been built in the BIC portion of scratch pad 404. That is, the initial and final addresses have been stored as a result of the application of the EXC 20 (external command 20) command from computer 16. However, the information from page 416 is not yet transferred from computer memory 16B to the Read/Write buffer memory 406. Rather, the next command from computer 16 is the ØAR 16 command which, under control of microprocessor 400, selects floppy disc controller 403 the address of which is 16. Thus, controller 403 is now activated wherein the command track address (TRK ADDR) which has been stored in RAM location 16 is now transferred to floppy disc controller 403 and causes the controller to produce a track-seek operation on the floppy disc apparatus. As noted, the BIC task which has previously been built in the scratch pad memory 404 is effectively suspended at this time. Next, computer 16 produces the command ØAR 16 which again selects floppy disc controller 16. The computer then supplies command sector address (SECT ADDR) which is stored in RAM location 2 and which is now supplied to floppy disc controller 403 to select the sector of the previously selected track. The operation of the computer in supplying data and/or commands in a chained fashion can be continued merely through the operation of the RAM access counter 13 which provides a pointer to sequentially select the next available location. In the meantime, the RAM address holding register 12 also supplies a pointer from the microprocessor which selects the operation which is being undertaken. Thus, while computer 16 is supplying the various commands and/or data information noted above in RAM location 10-2, the microprocessor is also executing in accordance with these commands and/or data in its fashion by applying a pointer via bus 20. In the illustration given, after computer 16 has supplied the sector address to RAM location 2, the computer can continue by supplying other commands and/or data to the RAM locations in sequence. If it is assumed that the microprocessor pointer has continuously followed along the RAM locations, and performed the operations as instructed, when the microprocessor pointer reaches RAM location 2 and the sector address is obtained, the control memory 405 will then indicate that the transfer of information as indicated in the previously described BIC task should now be implemented and the information at page 416 in computer 16B will be transferred from the computer memory through to the floppy disc using only that RAM location which was most recently involved as was previously described relative to the data compression operation. Thus, it can be seen that computer 16 can be outputting commands and/or data to RAM 10 wherein the plurality of commands and/or data can be chained in any suitable fashion. These commands and/or data are then removed by microprocessor 400 along bus 20 and appropriate operations are undertaken. Moreover, in the example given, after the command in location 10 is removed, this location can now be utilized by computer 16 for the next command or data information. Likewise, RAM locations 11-16 and the like become available also. This permits computer 16 to run substantially continuously wherein the computer need not wait for the external controllers or devices to perform a function before the computer can move on to the next operation. This permits extraordinarily rapid computer operation without any significant restrictions on the operation of peripheral devices.

To illustrate this, it must be understood that a plurality of tasks can be built or stored in scratch pad memory 404 for subsequent operation under the control of microprocessor 400 and control memory 405 which can better interface with the relatively slow output or peripheral devices such as a floppy disc unit. Thus, the computer 16 can produce at the relatively high speed thereof tasks which can be performed by a plurality of peripheral devices without waiting for any one of these peripheral devices to complete its task. Rather, the relatively slow output devices can function in their own real time under the control of microprocessor 400.

Figure 5:
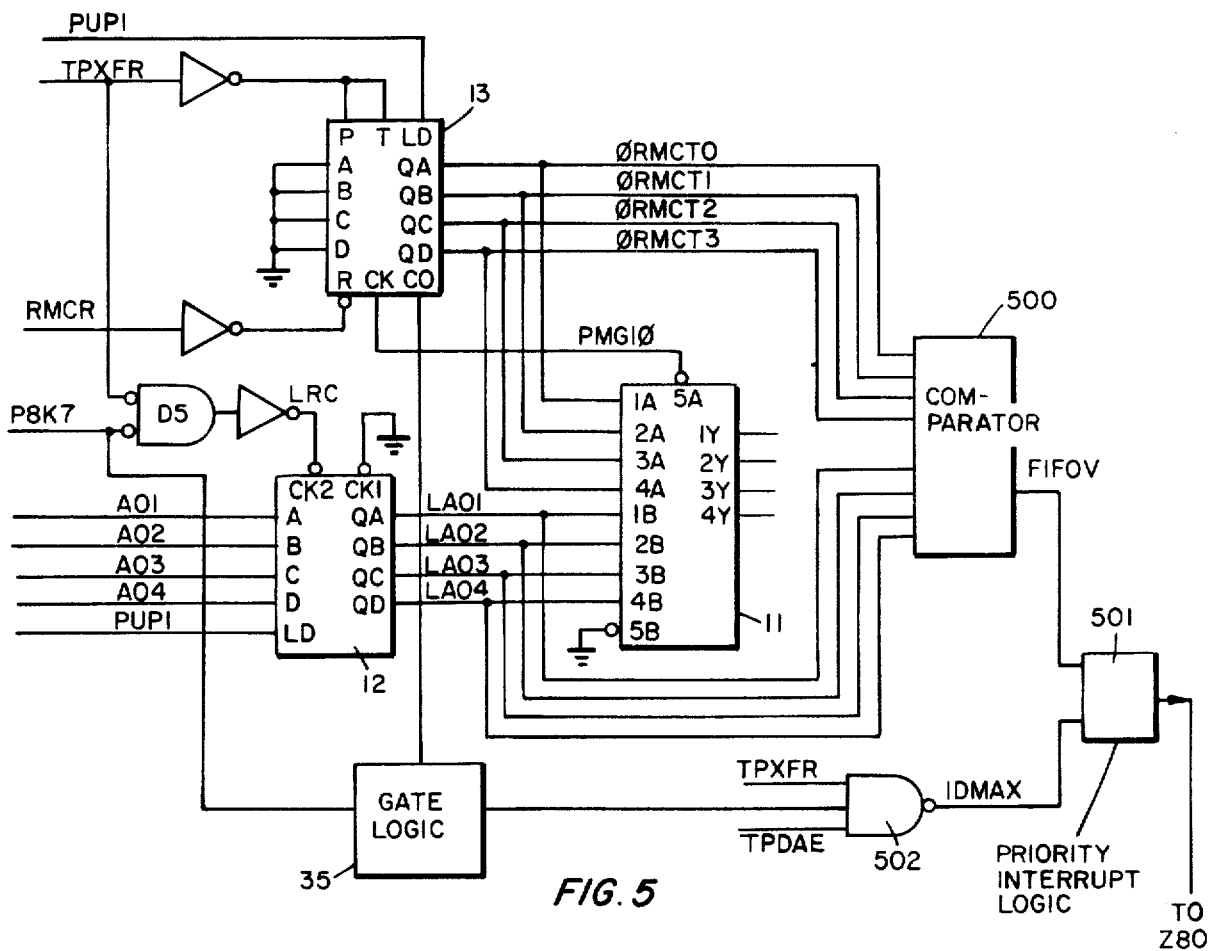
FIG. 5 is a circuit diagram of another embodiment of the circuitry shown in FIG. 2.

Referring now to FIG. 5, there is shown an alternative circuit arrangement which can be utilized in the instant invention. Initially, it should be noted that the circuitry shown in FIG. 2 is directed to an operation wherein only a limited number of (e.g., two) tasks can be built in scratch pad memory 404 for any particular controller if transferring DMA data is involved. That is, when a DMA task has been built in the scratch pad memory and transfer started, and gate E16 is activated and the microprocessor register 12 as well as MUX 11 are effectively disabled and no additional operations can be undertaken nor can any additional commands and/or data be transferred from computer 16. However, in the embodiment shown in FIG. 5, the Nand gate E16 is removed wherein multiplexer MUX 11 is not disabled when the DMA task has been built in the scratch pad memory 404. Rather, in this embodiment, the output terminals of access counter 13 and the output terminals of address-holding register 12 are supplied to a comparator 500. This comparator 500 operates to produce a selective control signal to indicate the output signals from counter 13 and register 12 are identical. That is, when an identity exists, computer 16 is attempting to supply information (command or data) into the RAM location which the microprocessor is attempting to read. In other words, computer 16 has "lapped" the microprocessor and is attempting to overlay new information in an old location which has not yet been fully utilized by the microprocessor. Appropriate control signals are provided from the gate-logic 35 to assure that the circuitry is properly being interrogated. The signals are then supplied to the microprocessor priority interrupt logic 501 which prevents additional information from being supplied to RAM 10. Conversely, the priority interrupt can be utilized to inform the microprocessor that erroneous DMA data is being operated upon and appropriate action must be taken to retrieve the correct information from the memory of computer 16. This involves retransferring the last data word by the DMA logic in the same manner as previously described relative to the dual-port memory. Of course, the occurence of computer 16 writing in RAM 10 and microprocessor 400 reading from RAM 10 at the same time will be very infrequent and performance will not be greatly affected. At the same time, other activities can be taking place. For example, with the system shown and described herein, the advantage of look-ahead and look-backward operation is possible. That is, while FDC 403 is carrying out a particular function such as a track-seek, a sector-search or the like, the microprocessor can be operating to look forward through the RAM contents to determine if other tasks of this nature are to be carried out. Thus, another FDC operation can be observed, stored and a task built. In the particular embodiment disclosed herein, it is typical that one additional task for any particular device is noted and stored. Of course, other devices such as additional FDCs or the like can have additonal tasks assembled and stored in scratch pad memory 404. Inasmuch as the memory is, effectively, a circular queue, a continuous probing of RAM 10 has the effect of establishing a look-backward approach also.

Thus, there has been shown and described a new and unique apparatus for performing an interfacing function between a relatively fast operating computer and relatively slow operating controllers via a microprocessor and a single memory unit. The memory unit functions as a circular queue type memory. That is, the computer can output information to the memory on a high-speed continuous basis. The microprocessor retrieves the information from the memory at the operating speed thereof and causes output controllers to be rendered operative in suitable fashion. The apparatus permits chaining of data and/or commands in the memory in any order or sequence. Also, the apparatus permits large amounts of data to be transferred from the computer to the microprocessor through a single location of the memory unit. Furthermore, the memory unit can operate as a dual port memory.

It is clear that this description is directed to certain specific elements, such as disk drives and the like. The concept can be used with other devices such as magnetic tape drives or the like. Moreover, certain circuit arrangements (and ICs) are shown and described. This description is intended to be illustrative only and not to be limitative. Any modifications made by others and which fall within the purview of this description are intended to be included therein as well. The scope of the invention is limited only by the scope of the claims appended hereto.

Having thus described a preferred embodiment of the invention, what is claimed is:

1. An interfacing system comprising,
   multiplexer means (11) for selectively passing signals therethrough,
   memory means (10) having the address terminals thereof connected to the output terminals of said multiplexer means (11) to receive signals therefrom,
   first memory addressing means (13) connected to said multiplexer means to supply address signals thereto,
   second memory addressing means (12) connected to said multiplexer means to supply address signals thereto,
   input means (16) for supplying information to be stored in said memory means at a location addressed by said first memory addressing means via said multiplexer means,
   output means (20) for retrieving information from said memory means at a location addressed by said second memory addressing means via said multiplexer means, and
   control means (404) connected to said first memory addressing means (13) and to said output means (20) in order to monitor the address signals produced by said first memory addressing means (13) so as to prevent said output means (20) from operating on information which was retrieved from said memory means (10) at the same time as said input means (16) supplied information to said memory means (10) which information retrieval condition is indicated by a change in the address signals monitored at said first memory addressing means (13).

2. The system recited in claim 1 wherein,
   said input means includes a relatively fast computer, and
   said output means includes a relatively slow microprocessor.

3. The system recited in claim 1 wherein,
   said second memory addressing means comprises an address holding register for holding address signals to be selectively applied to said memory means, and
   said first memory addressing means comprises an access counter for selectively supplying address signals to said memory means.

4. The system recited in claim 1 including,
   said multiplexer means having the separate sets of input terminals thereof connected to said first and second memory addressing means, respectively, and the output terminals thereof connected to said memory means such that said memory means is mutually exclusively connected to only one of said first and second memory addressing means at any time via said multiplexing means.

5. The system recited in claim 4 including,
   means connected to said multiplexer means for controlling the operation thereof.

6. The system recited in claim 1 wherein,
   said memory means comprises a RAM.

7. The system recited in claim 1 including,
   decision means (17, 18) for operating upon the information from said input means (16) and deciding whether the information supplied by said input means is function information or data information and selectively providing data signals to said memory means (10) from said input means.

8. The system recited in claim 7 wherein,
   said decision means includes PROM means (18) for supplying address information to said memory means.

9. The system recited in claim 7 wherein,
   said decision means comprises a second multiplexer means (17) connected to receive status signals from said input means (16) which signals indicate whether a data ready (DRY) status or function ready (FRY) status exists,
   said second multiplexer means further connected to supply signals to said memory means to signify the status which exists in accordance with the status signals received from said input means.

10. The system recited in claim 5 including
    switching means (19) for selectively altering the status of said PROM means (18) to expand the apparent contents thereof.

11. The system recited in claim 8 including,
    further multiplexer means having one set of input terminals connected to said PROM means and another set of input terminals connected to said input means, and having the output terminals connected to said memory means to selectively apply to said memory means, signals from one of said input means or said PROM means.

12. The system recited in claim 11 including
    latching means for receiving signals from said PROM means and selectively supplying said signals to said further multiplexer.

13. The system recited in claim 11 wherein,
    said PROM means (18) is connected to said input means to selectively receive signals therefrom, whereupon said PROM means supplies signals to said memory means via said further multiplexer means.

14. The system recited in claim 1 wherein,
    said control means interrupts the information retrieving operation of the output means (20) upon the indication of a change in address signal produced by said first memory addressing means after information is retrieved by said output means.

15. The system recited in claim 1 wherein,
    said second memory addressing means (12) includes means (12) for temporarily storing the address signals supplied by said first memory addressing means (13) when said output means begins a retrieval of information operation from said memory means,
    compare means (500) for comparing the temporarily stored address signals with the address signals supplied by said first memory addressing means (13) when said output means concludes the retrieval of information operation, and
    interrupt means (501) for indicating the lack of an identical comparison at said compare means thereby to control the utilization of the information retrieved by said output means during said retrieval of information operation.

16. The system recited in claim 15 wherein,
    said input means includes first means (15) for supplying a portion of said information to be stored, and
    second means (18) for supplying a further portion of said information to be stored in said memory means.

17. The system recited in claim 16 wherein, said first means (15) comprises a bus connected to a source (16) of information, and said second means includes a PROM which is connected to receive signals from said first means and to supply information to be stored in said memory means in accordance with signals supplied to said PROM means by said first means.

18. An interfacing system comprising, multiplexer means (11) for selectively passing signals therethrough, memory means (10) having the address terminals thereof connected to the output terminals of said multiplexer means (11) to receive signals therefrom, first memory addressing means (13) connected to said multiplexer means to supply address signals thereto, second memory addressing means (12) connected to said multiplexer means to supply address signals thereto, input means (16) for supplying information to be stored in said memory means at a location addressed by said first memory addressing means via said multiplexer means, output means (20) for retrieving information from said memory means at a location addressed by said second memory addressing means via said multiplexer means, and comparison means (500) for comparing the address signals supplied by said first memory addressing means before and after said output means retrieves information from said memory means, said comparison means operable to produce an interrupt signal if the address signals compared thereby are not identical which interrupt signal, effectively, invalidates the information retrieval by said output means.

* * * * *